Jan. 3, 1950     A. M. CANDY     2,493,388
MAGNETIC CONTROL SYSTEM

Filed Aug. 17, 1946     2 Sheets-Sheet 1

INVENTOR.
Albert M. Candy,
BY Brown, Jackson, Boettcher & Dienner
Attys

Jan. 3, 1950      A. M. CANDY      2,493,388
MAGNETIC CONTROL SYSTEM
Filed Aug. 17, 1946      2 Sheets-Sheet 2
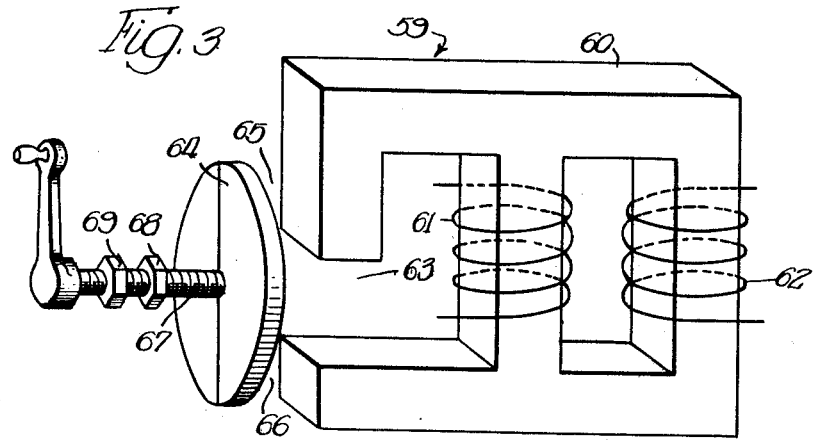
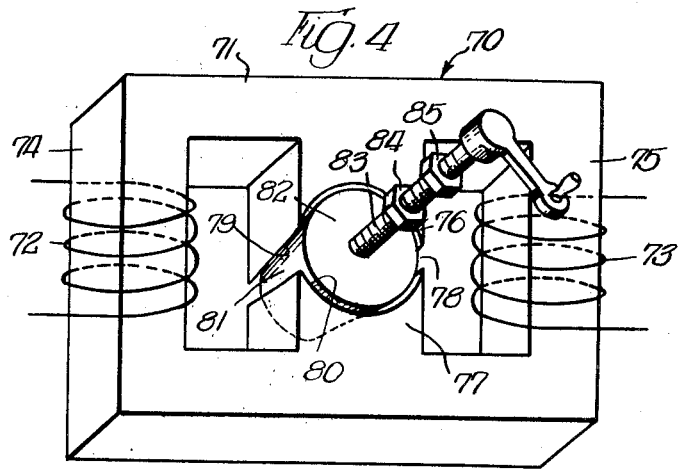
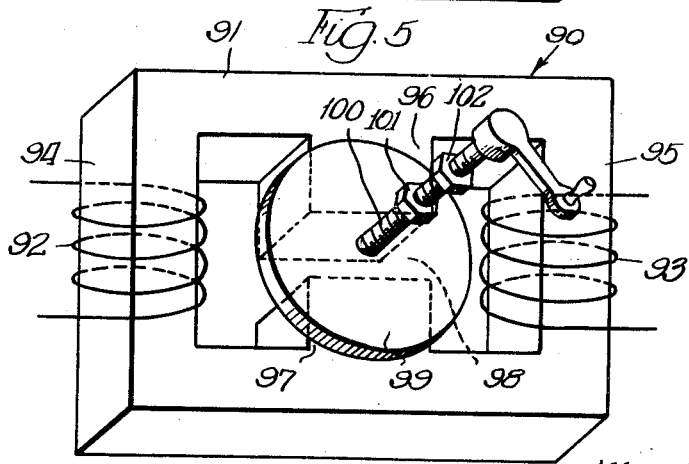
INVENTOR.
Albert M. Candy,
BY
Brown, Jackson, Boettcher & Dienner
attys.

Patented Jan. 3, 1950

2,493,388

UNITED STATES PATENT OFFICE 2,493,388

MAGNETIC CONTROL SYSTEM

Albert M. Candy, La Grange, Ill., assignor, by mesne assignments, to National Cylinder Gas Company, Chicago, Ill., a corporation of Delaware Application August 17, 1946, Serial No. 691,358

1 Claim. (Cl. 171—119)

My invention relates, generally, to magnetic control systems, and it has particular relation to means for varying the air gap in a magnetic circuit in order to vary the impedance of a winding thereon or the flux linkage between inductively related windings on the same.

In a transformer employed, for example, for performing arc welding operations, it is necessary to provide means for varying the amount of current supplied to the arc in accordance with the particular work that is being done. It is desirable that the current varying means be capable of providing a substantially uniform current change for a given movement thereof. Adjustments may be accomplished by varying the magnetic flux linking the primary and secondary windings of the welding transformer. This varying of the magnetic flux may be effected by providing an air gap in the core of the transformer, and variably shunting it to effect the desired control.

Among the objects of my invention are: To move a flux shunting member relative to the air gap in a magnetic core with a combined rotary and translatory movement so as to vary uniformly the length of the air gap for a given movement of the flux shunting member; to employ a flux shunting member so shaped and mounted for movement that the length of the air gap between it and the magnetic core is the same over its entire area; to employ different geometric shapes to accomplish the foregoing, and; to embody these features in a transformer that is employed for supplying current from an alternating current source to an arc welding circuit.

Other objects of my invention will, in part, be obvious, and in part appear hereinafter.

My invention is disclosed and the embodiments thereof shown in the accompanying drawings, and it comprises the features of construction, combination of elements and arrangement of parts which will be exemplified in the constructions hereinafter set forth and the scope of the application of which will be indicated in the appended claim.

Figure 1:
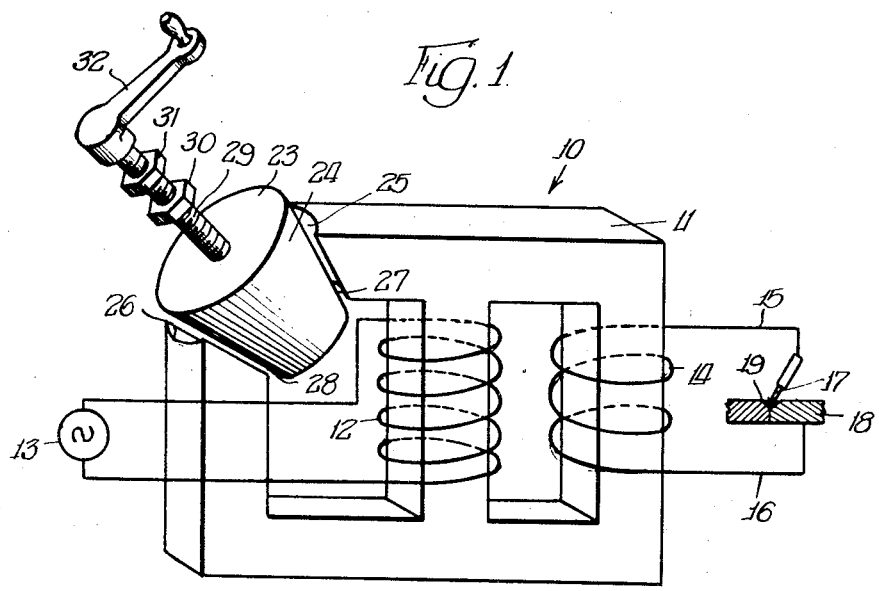

For a more complete understanding of the nature and scope of my invention, reference can be had to the following detailed description, taken together with the accompanying drawings, in which:

Figure 1 illustrates, diagrammatically, an arc welding transformer in which one embodiment of the present invention is incorporated; and Figures 2, 3, 4 and 5 illustrate, diagrammatically, additional embodiments of my invention.

Referring now particularly to Figure 1 of the drawing, it will be observed that the reference character 10 designates, generally, a transformer. The transformer 10 is provided with a core 11 of laminated magnetic material, on which a primary winding 12 is located and arranged to be energized from a suitable source 13 of alternating current, such as a 60-cycle source. A secondary winding 14 is also located on the core 11 in inductive relation to primary winding 12, and it is arranged to energize a welding circuit which may comprise conductors 15 and 16. The conductors 15 and 16 may be connected, respectively, to a welding electrode 17 and work 18, between which an arc 19 is maintained for performing the welding operation.

As indicated above, it is necessary to provide for varying the current supplied by the secondary winding 14 to the welding arc 19, depending upon the character of the work being done. In accordance with the present invention, this is accomplished by varying the flux interlinking the primary winding 12 and the secondary winding 14.

It will be noted that the core 11 is generally rectangular in shape, and that one corner thereof is cut away to provide an air gap therein. The air gap is provided in the corner for convenience, but it will be understood that it may be located elsewhere in the core 11, as will be apparent from what is set forth hereinafter.

With a view to variably shunting the air gap at the corner of the magnetic core 11, there is provided a shunt 23 of suitably laminated magnetic material, the surface 24 of which is conical, for cooperation with correspondingly shaped surfaces 25 and 26 of the magnetic core 11. Between the surface 24 of the shunt 23 and the surfaces 25 and 26 of the core 11, air gaps 27 and 28 are provided. The length of these air gaps is varied in accordance with the present invention, for the purpose of varying the flux linkage between windings 12 and 14, as will be understood readily.

Now it is desired that the lengths of the air gaps 27 and 28 for any given position of the shunt 23 be uniform throughout the entire area thereof. The reason for this is to avoid the concentration of magnetic flux at locations where the change in the length of the air gap is not uniform over the entire area, which may result in lack of change in the flux linkage between the windings 12 and 14, although the shunt 23 might be moved relative to the core 11 a substantial distance.

In order to change the lengths of the air gaps 27 and 28 uniformly, the conical surfaces are provided, and provision is made for mounting the shunt 23 for both rotary and translatory movement. It will be obvious that, if the shunt 23 is moved along its axis of rotation, which is equidistant from the surfaces 25 and 26, the length of the air gaps 27 and 28 will change uniformly so that for any given position of the shunt 23 the length of the air gap over its entire area is uniform.

For mounting the shunt 23 for both rotary and translatory movement, it may be provided with a threaded shaft 29 that is supported by suitable threaded bearings which are illustrated in the form of nuts 30 and 31. It will be understood that the threaded bearings or nuts 30 and 31 are suitably stationarily mounted so that, when the shaft 29 is rotated, it will move toward and away from the core 11, depending upon the direction of rotation, and will carry with it the shunt 23.

Any suitable mechanism may be provided for rotating shaft 29. For example, the handle 32 may be secured thereto to permit the manual rotation of the shaft 29. A suitable indicator can be provided, if desired, to indicate the amount of current which will flow through the secondary winding 14 for any given position of the shunt 23. Suitable reduction gearing can be provided between the manually operable handle or hand wheel and the shaft 29 for operating the latter if it is desired to have a gear reduction therebetween.

When the shunt 23 is moved inwardly, so as to reduce the length of the air gaps 27 and 28 to a minimum, there will be a minimum of flux linkage between the windings 12 and 14, since a large portion of the flux is shunted around the winding 12 by the shunt 23. Accordingly, this will be the position where a minimum flow of welding current will take place. As the shunt 23 is moved outwardly from the core 11, the interlinking flux will be increased correspondingly, and there will be a corresponding increase in the current flow in the secondary winding 14. Since the surface 24 of the shunt 23 is always spaced uniformly from the cooperating conical surfaces 25 and 26 of the core 11, there will be a uniform change in the flux that is shunted around the primary winding 12 as the shunt 23 is moved in and out.

If desired, the present invention can be employed for controlling the impedance of a variable impedance device. Thus, by omitting the secondary winding 14, or open circuiting the same, a variable impedance device is provided which may be used for any purpose well known to those skilled in the art.

Figure 2:
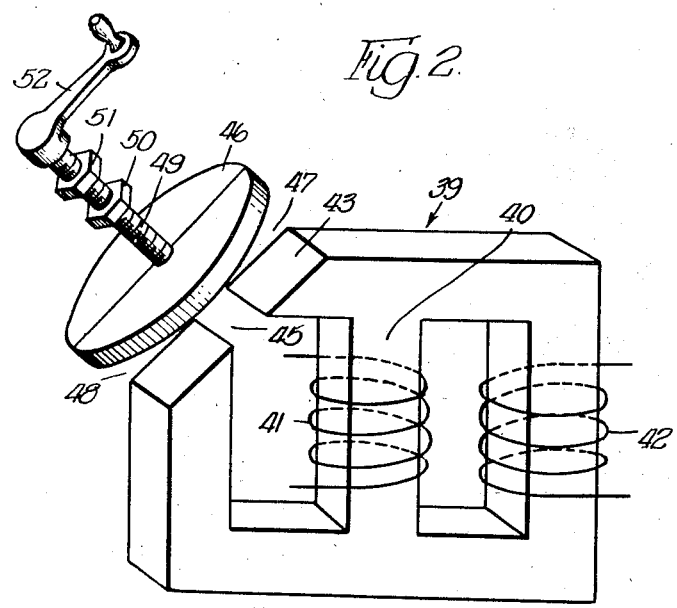

In Figure 2 of the drawing, there is illustrated another embodiment of my invention. It is illustrated in connection with a transformer that is shown, generally, at 39, and comprises a core 40 of laminated magnetic material having a primary winding 41 and a secondary winding 42 located thereon. It will be understood that the primary winding 41 can be connected to a suitable source of alternating current, such as source 13, and that the secondary winding 42 can be connected to a suitable load circuit, such as the welding circuit previously described.

It will be observed that the core 40 is generally rectangular in shape and that one corner thereof has been cut off so that inclined faces 43 and 44 are provided with an air gap 45 therebetween. In order to variably bridge the air gap 45, a circular plate 46 of laminated magnetic material may be employed. Air gaps 47 and 48, between the faces 43 and 44 and the plate 46 are varied, in order to change the characteristics of the magnetic circuit and thereby the flux interlinking the windings 41 and 42.

With a view to maintaining the distance between the under side of the plate 46 and the faces 43 and 44 for any position of the former, the plate 46 is mounted for rotary and translatory movement about its axis by means of a threaded shaft 49. The shaft 49 is mounted in threaded bearings 50 and 51, which, for illustrative purposes, are shown in the form of nuts. It will be understood that the nuts 50 and 51 will be mounted stationarily, so that, on rotation of the shaft 49, it will move relatively thereto to effect corresponding movement of the plate 46 toward or away from the faces 43 and 44 of the core 40. A handle 52 may be located on the shaft 49 to provide for manual rotation thereof.

In the construction shown in Figure 2 of the drawing, when the plate 46 is in close proximity to the faces 43 and 44, or engages the same, there will be a minimum of flux linkage between the windings 41 and 42. Consequently, in this position of the plate 46, the minimum current will flow through the secondary winding 42. This flow of current will be increased as the plate 46 is moved away from the faces 43 and 44.

As illustrated in Figure 3, it is unnecessary to cut off a corner of the magnetic core to provide the desired air gap, and means for varying the same. In Figure 3 there is shown a transformer that is indicated, generally, at 59. It comprises a core 60 of laminated magnetic material having windings 61 and 62 thereon. The winding 61 may be a primary winding, and connected to a source of alternating current, which may be the source 13, while the secondary winding 62 may be connected to a load circuit, such as the welding circuit illustrated in Figure 1. An air gap 63 may be provided in the core 60 by making one of the legs thereof shorter than the opposite leg. A plate 64, similar to the plate 46, Figure 2, may be provided for variably bridging the air gap 63 to vary the length of the air gaps 65 and 66 between the undersurface of the plate 64 and the adjacent surfaces of the core 60. The plate 64 may be mounted on a shaft 67 that is journaled in threaded nuts 68 and 69, which serve as bearings for the shaft 67. Any suitable means may be provided for rotating the shaft 67 to effect a combined rotary and translatory movement of the plate 64.

In Figure 4 of the drawings, there is illustrated a construction which is somewhat similar to that illustrated in Figure 1. It will be observed that the reference character 70 designates, generally, a transformer having a core 71 of suitable laminated magnetic material, on which are located a primary winding 72 and a secondary winding 73. It will be understood that the primary winding 72 may be connected to a suitable source of alternating current, such as the source 13, and that the secondary winding 73 may be connected to a load circuit, such as the welding circuit illustrated in Figure 1. The primary and secondary windings 72 and 73 are located on the outside legs 74 and 75 of the core 71.

In order to vary the flux linkage between the windings 72 and 73, there is provided an intermediate leg comprising sections 76 and 77 with an air gap 78 therebetween. The opposing faces, 79 and 80, of the air gap 78 are conical, and cooperate with a conical surface 81 of a cone 82, which is formed of suitable laminated magnetic material. The cone 82 or shunt for varying the effective length of the air gap 78, is mounted for movement on a threaded shaft 83. That, in turn, is mounted in suitable bearing nuts 84 and 85. Suitable means may be provided for rotating the shaft 83 relative to the nuts 84 and 85 which are stationarily mounted, so as to move the cone or shunt 82 with a combined rotary and translatory movement toward or away from the faces 79 and 80. Since the cone or shunt 82 is mounted for movement along the longitudinal axis thereof, which is equidistant from the surfaces 79 and 80, for any position of the cone or shunt 82, the distances between its surface 81 and the cooperating conical surface 79 or 80 will be the same over the entire area of the air gaps therebetween.

In Figure 5 of the drawings, there is illustrated another embodiment of the invention which is somewhat similar to the embodiments disclosed in Figures 2 and 3 of the drawings. A transformer designated, generally, at 90 is provided having a core 91 of the suitable laminated magnetic material. The core 91 has located thereon a primary winding 92 and a secondary winding 93. It will be understood that the primary winding 92 can be connected for energization to a suitable source of alternating current, such as the source 13, and that the secondary winding 93 can be connected to a suitable load circuit, such as the welding circuit illustrated in Figure 1.

The primary and secondary windings 92 and 93 are located on outside legs 94 and 95, respectively, of the core 91. In order to vary the flux linkage between the windings 92 and 93, there is provided an intermediate leg comprising sections 96 and 97, having an air gap 98 therebetween. Provision is made for shunting the air gap 98 by a plate 99 of suitable laminated magnetic material. The plate 99 is mounted for both rotary and translatory movements on a shaft 100. The shaft 100 is threaded, and is mounted for rotation in suitably threaded nuts 101 and 102 that are stationarily mounted. Any suitable means can be provided for rotating the shaft 100 to move the plate 99 toward and away from the sections 96 and 97 of the intermediate leg.

Since certain further changes can be made in the foregoing constructions, and different embodiments of the invention can be made without departing from the spirit and scope thereof, it is intended that all matter shown in the accompanying drawings and described hereinbefore, shall be interpreted as illustrative and not in a limiting sense.

I claim as my invention:

A variable impedance device comprising, in combination, a generally rectangular magnetic core structure having an air gap in one corner provided with concave conical opposing faces, a winding on said core structure the impedance of which is to be varied, a conical magnetic shunt for bridging said air gap, and means mounting said magnetic shunt for both rotary and translatory movement toward and away from said core structure for variably bridging said air gap to effect corresponding change in the impedance of said winding.

ALBERT M. CANDY.

REFERENCES CITED

The following references are of record in the file of this patent:

UNITED STATES PATENTS

| Number | Name | Date |
|---|---|---|
| 381,815 | Ries | Apr. 24, 1888 |
| 1,844,531 | Wey et al. | Feb. 9, 1932 |
| 1,943,463 | Ohlsen et al. | Jan. 16, 1934 |
| 2,143,298 | Boucke | Jan. 10, 1939 |
| 2,443,300 | Carter | June 15, 1948 |

FOREIGN PATENTS

| Number | Country | Date |
|---|---|---|
| 25,919 | Great Britain | Nov. 12, 1913 |
| 211,692 | Germany | Dec. 19, 1908 |
| 687,944 | France | May 5, 1930 |